United States Patent
Wang (10) Patent No.: US 8,902,275 B2
(45) Date of Patent: Dec. 2, 2014

(54) CODE STREAM PROCESSING METHOD AND SYSTEM, MULTIPOINT CONTROL UNIT

(71) Applicant: Huawei Technologies Co., Ltd., Shenzhen, Guangdong (CN)

(72) Inventor: Yafei Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/141,168

(22) Filed: Dec. 26, 2013

(65) Prior Publication Data

US 2014/0176667 A1 Jun. 26, 2014

(30) Foreign Application Priority Data

Dec. 26, 2012 (CN) .......................... 2012 1 0574630

(51) Int. Cl.
 *H04N 7/14* (2006.01)
 *H04N 7/15* (2006.01)
(52) U.S. Cl.
 CPC .................................... *H04N 7/152* (2013.01)
 USPC ....................................................... 348/14.01
(58) Field of Classification Search
 None
 See application file for complete search history.

(56) References Cited

U.S. PATENT DOCUMENTS

| | | | |
|---|---|---|---|
| 8,300,556 B2* | 10/2012 | Kalipatnapu et al. | 370/260 |
| 2008/0153442 A1* | 6/2008 | Chen | 455/187.1 |
| 2009/0225152 A1 | 9/2009 | Saleh et al. | |
| 2013/0010050 A1* | 1/2013 | Lindbergh | 348/14.01 |
| 2013/0021432 A1* | 1/2013 | Kalipatnapu et al. | 348/14.09 |
| 2013/0047192 A1* | 2/2013 | Triplicane et al. | 725/105 |
| 2013/0088563 A1* | 4/2013 | Wu | 348/14.07 |
| 2013/0093835 A1* | 4/2013 | Paithankar et al. | 348/14.07 |
| 2013/0328989 A1* | 12/2013 | Thayer et al. | 347/206 |
| 2013/0328998 A1* | 12/2013 | Duckworth et al. | 348/14.07 |

FOREIGN PATENT DOCUMENTS

| | | |
|---|---|---|
| CN | 101031065 A | 9/2007 |
| CN | 101894405 A | 10/2010 |
| CN | 102638672 A | 8/2012 |
| CN | 102724475 A | 10/2012 |

* cited by examiner

*Primary Examiner* — Maria El-Zoobi
(74) *Attorney, Agent, or Firm* — Leydig, Voit & Mayer, Ltd.

(57) ABSTRACT

Embodiments of the present disclosure provide a code stream processing method and system, and a multipoint control unit. The code stream processing method includes: obtaining code stream information of each site, and type attribute information of a target site; determining a site type of the target site according to the type attribute information, searching a code stream processing policy file to obtain a code stream output policy corresponding to the site type of the target site; and according to code stream output policy, using the code stream information of each site to generate a code stream of the target site and sending it to the target site to present it in the target site.

16 Claims, 9 Drawing Sheets

| Three-screen teacher site | | | | | | | Single-screen teacher site |
|---|---|---|---|---|---|---|---|
| Left screen of a three-screen site | | | Middle screen of a three-screen site | Right screen of a three-screen site | | | Main screen of a single-screen site |
| Code stream output policy | | | Code stream output policy | Code stream output policy | | | Code stream output policy |
| X-0 screen of a three-screen student site (left screen) | X-1 screen of a three-screen student site (main screen) | X-2 screen of a three-screen student site (right screen) | Demonstration image | Y-0 screen of a three-screen student site (left screen) | Y-1 screen of a three-screen student site (main screen) | Y-2 screen of a three-screen student site (right screen) | Demonstration image |
| Alternative code stream output policy 1 | | | Alternative code stream output policy 1 | Alternative code stream output policy 1 | | | Alternative code stream output policy 1 |
| Single-screen student site X | | | Demonstration image | Single-screen student site X | | | Demonstration image |
| Alternative code stream output policy 2 | | | Alternative code stream output policy 2 | Alternative code stream output policy 2 | | | Alternative code stream output policy 2 |
| -1 screen of a three-screen teacher site | | | Demonstration image | -1 screen of a three-screen teacher site | | | Demonstration image |

FIG. 4a

| Three-screen teacher site | | | Single-screen teacher site |
|---|---|---|---|
| Left screen of a three-screen site | Middle screen of a three-screen site | Right screen of a three-screen site | Main screen of a single-screen site |
| Code stream output policy | Code stream output policy | Code stream output policy | Code stream output policy |
| -1 screen of a three-screen teacher site | Demonstration image | X-0 screen of a three-screen student site (left screen) \| X-1 screen of a three-screen student site (main screen) \| X-2 screen of a three-screen student site (right screen) | Demonstration image |
| Alternative code stream output policy 1 | Alternative code stream output policy 1 | Alternative code stream output policy 1 | Alternative code stream output policy 1 |
| Single-screen teacher site | Demonstration image | Single-screen student site X | Demonstration image |
| Alternative code stream output policy 2 | Alternative code stream output policy 2 | Alternative code stream output policy 2 | Alternative code stream output policy 2 |
| Nothing | Demonstration image | -1 screen of a three-screen teacher site | Demonstration image |

FIG. 4b

| Three-screen teacher site | | | Single-screen teacher site |
|---|---|---|---|
| Left screen of a three-screen site | Middle screen of a three-screen site | Right screen of a three-screen site | Main screen of a single-screen site |
| Code stream output policy | Code stream output policy | Code stream output policy | Code stream output policy |
| X-1 screen of a three-screen speech student site | Demonstration image | Y-0 screen of a three-screen student site (left screen) / Y-1 screen of a three-screen student site (main screen) / Y-2 screen of a three-screen student site (right screen) | Demonstration image / X-1 screen of a three-screen speech student site |
| Alternative code stream output policy 1 | Alternative code stream output policy 1 | Alternative code stream output policy 1 | Alternative code stream output policy 1 |
| Single-screen speech student site X | Demonstration image | Single-screen student site Y | Demonstration image / Single-screen speech student site |
| Alternative code stream output policy 2 | Alternative code stream output policy 2 | Alternative code stream output policy 2 | Alternative code stream output policy 2 |
| Nothing | Demonstration image | -1 screen of a three-screen teacher site | Nothing |

FIG. 5a

| Three-screen teacher site | | | Single-screen teacher site |
|---|---|---|---|
| Left screen of a three-screen site | Middle screen of a three-screen site | Right screen of a three-screen site | Main screen of a single-screen site |
| Code stream output policy | Code stream output policy | Code stream output policy | Code stream output policy |
| -1 screen of a three-screen teacher site | Demonstration image | X-1 screen of a three-screen speech student site | Demonstration image / X-1 screen of a three-screen speech student site |
| Alternative code stream output policy 1 | Alternative code stream output policy 1 | Alternative code stream output policy 1 | Alternative code stream output policy 1 |
| Single-screen teacher site | Demonstration image | Single-screen speech student site X | Demonstration image / Single-screen speech student site X |
| Alternative code stream output policy 2 | Alternative code stream output policy 2 | Alternative code stream output policy 2 | Alternative code stream output policy 2 |
| Nothing | Demonstration image | Nothing | Nothing |

CODE STREAM PROCESSING METHOD AND SYSTEM, MULTIPOINT CONTROL UNIT

CROSS-REFERENCE TO RELATED APPLICATION

This application claims priority to Chinese Patent Application No. 201210574630.0, filed on Dec. 26, 2012, which is hereby incorporated by reference in its entirety.

TECHNICAL FIELD

The present disclosure relates to communications technologies, and in particular, to code stream processing methods and systems, and multipoint control units.

BACKGROUND

With the development of communications technologies, a multipoint video conference in daily life and work becomes an effective platform for people to communicate in different places, and is more widely applied in various application fields and scenarios.

In a conventional multipoint video conference, generally a multipoint control unit (Multipoint Control Unit, MCU for short) is adopted to control screen display of each site participating in the conference, and the MCU controls the screen display according to a preset display policy. Specifically, a conference controller needs to separately formulate a display policy for the site according to the characteristic of each site, for example, obtain a quantity of display screens of a certain site in advance, and formulates a display policy specific to the site according to the obtained number of display screens of the site, that is, settings of display content and a display manner of each display screen in the site, and then convert the display policy into a configuration file and import it to an MCU. When a video conference is ongoing, the MCU delivers to the site, according to the formulated display policy, received code stream information sent to the MCU by each sitesite, so as to display an image corresponding to the preset policy on a display screen of the site. For example, three sites in Beijing, Shanghai and Nanjing need to jointly hold a video conference, where a quantity of display screens in Beijing branch site is 3, a quantity of display screens in Shanghai branch site is 2, and a quantity of display screens in Nanjing branch site is 1. After obtaining a quantity of display screens in the three participating sites in Beijing, Shanghai and Nanjing, an MCU separately formulates a corresponding display policy for the three sites according to the obtained number of display screens. For example, in the beginning phase, the display policy of Beijing branch site is: the left display screen displays, in a split screen mode, an image included in a code stream of the Shanghai branch site, the middle display screen displays local Power Point slides, and the right display screen displays an image included in a code stream of the Nanjing branch site. These display policies are formulated into a configuration file to be imported to an MCU of a video conference system. When a conference is ongoing, in the beginning phase of the conference, the display screens of the Beijing branch site will display images on local screens according to the formulated display policy.

The code stream processing method of the conventional multipoint video conference has the following defects: the display policy is separately formulated according to the characteristic of each site, site policies may vary according to sites with different characteristics, and when formulating a display policy of a site, a quantity of display screens of each site participating in the video conference must be obtained in advance, and the display policy for each site is formulated according to the obtained number of display screens. When a quantity of screens of the sites participating in the conference changes, a user needs to reformulate a display policy; therefore, the adaptability of the display policy is poor in the multipoint video conference, and it is inconvenient for the user to use.

SUMMARY

Embodiments of the present disclosure provide a code stream processing method, a multipoint control unit and a code stream processing system, so as to solve the problem in the prior art that the adaptability of a multipoint video conference display policy is poor.

According to a first aspect, an embodiment of the present disclosure provides a code stream processing method, which is applied to a multipoint video conference system, including:

obtaining code stream information of each site, and type attribute information of a target site;

determining a site type of the target site according to the type attribute information, searching a code stream processing policy file to obtain a code stream output policy corresponding to the site type of the target site, where the code stream processing policy file includes at least two site types and the code stream output policy corresponding to the site type, and the code stream output policy is a code stream display manner of a site; and using code stream information of each site to generate a code stream of the target site according to the code stream output policy, and sending the code stream to the target site to present the code stream in the target site.

With reference to the first aspect, in a first possible implementation manner of the first aspect, the code stream processing policy file further includes: at least one conference mode, and at least one conference state;

each conference mode includes the at least one conference state;

before the obtaining the code stream output policy corresponding to the site type of the target site, the method further includes: obtaining a conference mode and conference state of the target site; and the obtaining a code stream output policy corresponding to a site type of the target site includes: obtaining a code stream output policy corresponding to the conference mode, conference state, and site type of the target site.

With reference to the first aspect, in a second possible implementation manner of the first aspect, the type attribute information includes: at least two site factors; and the at least two site types are permutation and combination types acquired by performing permutation and combination of the at least two site factors.

With reference to the first possible implementation manner of the first aspect, in a third possible implementation manner of the first aspect, before the obtaining the code stream output policy corresponding to the site type of the target site, the method further includes:

obtaining updated type attribute information of the target site, and according to the updated type attribute information, determining an updated site type of the target site; and the obtaining a code stream output policy corresponding to a site type of the target site specifically is: obtaining a code stream output policy corresponding to the updated site type of the target site.

With reference to the first possible implementation manner of the first aspect, in a fourth possible implementation manner of the first aspect, the obtaining a conference mode and conference state of the target site includes:

obtaining in a conference reservation or conference ongoing process; and the conference mode and conference state obtained in the conference ongoing process includes: an updated conference mode and conference state.

With reference to the first aspect, in a fifth possible implementation manner of the first aspect, the code stream output policy includes: the code stream output policy corresponding to the site type, and conference control information corresponding to the site type.

With reference to the first aspect, in a sixth possible implementation manner of the first aspect, the method further includes:

successively formulating at least one code stream output policy for each site type in a conference state of each conference mode according to a configured site screen quantity category, conference mode, conference state and conference role; and using the code stream output policy to generate a code stream processing policy file.

With reference to any one possible implementation manner of the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, and the sixth possible implementation manner of the first aspect, in a seventh possible implementation manner of the first aspect, a quantity of code stream output policies corresponding to the site type is at least one.

According to a second aspect, an embodiment of the present disclosure provides a multipoint control unit MCU, including:

an information management module, configured to obtain code stream information of each site, and type attribute information of a target site, and determine a site type of the target site according to the type attribute information;

a policy parsing module, configured to search a code stream processing policy file to obtain a code stream output policy corresponding to the site type of the target site, where the code stream processing policy file includes at least two site types and the code stream output policy corresponding to the site type, and the code stream output policy is a code stream display manner of a site;

a code stream processing module, configured to use code stream information of each site to generate a code stream of the target site according to the code stream output policy; and a sending module, configured to send the code stream to the target site to present the code stream in the target site.

With reference to the second aspect, in a first possible implementation manner of the second aspect, the code stream processing policy file searched by the policy parsing module further includes: at least one conference mode, and at least one conference state;

each conference mode includes the at least one conference state;

the information management module is further configured to: obtain a conference mode and conference state of the target site; and the policy parsing module is further configured to obtain a code stream output policy corresponding to the conference mode, conference state, and site type of the target site.

With reference to the second aspect, in a second possible implementation manner of the second aspect, the type attribute information obtained by the information management module includes: at least two site factors;

the at least two site types included in the code stream processing policy file searched by the policy parsing module are permutation and combination types acquired by performing permutation and combination of the at least two site factors.

With reference to the second possible implementation manner of the second aspect, in a third possible implementation manner of the second aspect, the information management module is further configured to obtain updated type attribute information of the target site, and according to the updated type attribute information, determining an updated site type of the target site; and the policy parsing module obtains a code stream output policy corresponding to the updated site type of the target site.

With reference to the first possible implementation manner of the second aspect, in a fourth possible implementation manner of the second aspect, the information management module is specifically configured to obtain a conference mode and conference state of the target site in a conference reservation or conference ongoing process; and obtain an updated conference mode and conference state in the conference ongoing process.

With reference to the second aspect, in a fifth possible implementation manner of the second aspect, the code stream output policy obtained by the policy parsing module includes: the code stream output policy corresponding to the site type, and conference control information corresponding the site type.

With reference to the second aspect, in a sixth possible implementation manner of the second aspect, the MCU further includes:

a code stream processing policy file generating module, configured to successively formulate at least one code stream output policy for each site type in a conference state of each conference mode according to a configured site screen quantity category, conference mode, conference state and conference role; and use the code stream output policy to generate a code stream processing policy file.

With reference to any one possible implementation manner of the first aspect, the first possible implementation manner of the second aspect, the second possible implementation manner of the second aspect, the third possible implementation manner of the second aspect, the fourth possible implementation manner of the second aspect, the fifth possible implementation manner of the second aspect, and the sixth possible implementation manner of the second aspect, in a seventh possible implementation manner of the second aspect, a quantity of code stream output policies that correspond to the site type and is obtained by the policy parsing module is at least one.

According to a third aspect, an embodiment of the present disclosure provides a code stream processing system, including: a video conference management unit, a site terminal of a target site and the multipoint control unit MCU in any one of the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect and the seventh possible implementation manner of the second aspect, where the video conference management unit is configured to generate the code stream processing policy file, and send the code stream processing policy file to the MCU; and the site terminal of a target site is configured to receive a code stream sent by the MCU, and display an image corresponding to the code stream according to the code stream;

the MCU comprises:

an information management module, configured to obtain code stream information of each site, and type attribute information of a target site, and determine a site type of the target site according to the type attribute information;

a policy parsing module, configured to search a code stream processing policy file and obtain a code stream output policy corresponding to the site type of the target site, wherein the code stream processing policy file comprises at least two site types and the code stream output policy corresponding to the site type, and the code stream output policy is a code stream display manner of a site;

a code stream processing module, configured to use code stream information of each site to generate a code stream of the target site according to the code stream output policy; and a sending module, configured to send the code stream to the target site to present the code stream in the target site.

With reference to the third aspect, in a first possible implementation manner of the third aspect, the site terminal or video conference management unit is further configured to obtain updated type attribute information of the target site, and send the updated type attribute information to the MCU, so that the MCU determines an updated site type of the target site according to the updated type attribute information.

In the code stream processing method and system, and the multipoint control unit provided by the embodiments of the present disclosure, the MCU obtains code stream information of each site, and type attribute information of a target site; determines a site type of the target site according to the type attribute information, searches a code stream processing policy file to obtain a code stream output policy corresponding to the site type of the target site, uses the code stream information of each site to generate a code stream of the target site according to the code stream output policy, and sends the code stream to the target site to present in the target site a screen display state corresponding to the code stream. The target site is abstracted into different site types according to the type attribute information, and the code stream processing policy file includes a code stream output policy of each site type. Evidently, because the code stream output policy includes code stream output policies corresponding to multiple site types of a target site, each target site has a corresponding code stream output policy. Even if a participating site changes, there is always a code stream output policy corresponding to the participating site, so that the adaptability of the code stream processing policy is strong.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure more comprehensible, the technical solutions in the embodiments of the present disclosure are clearly described in the following with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
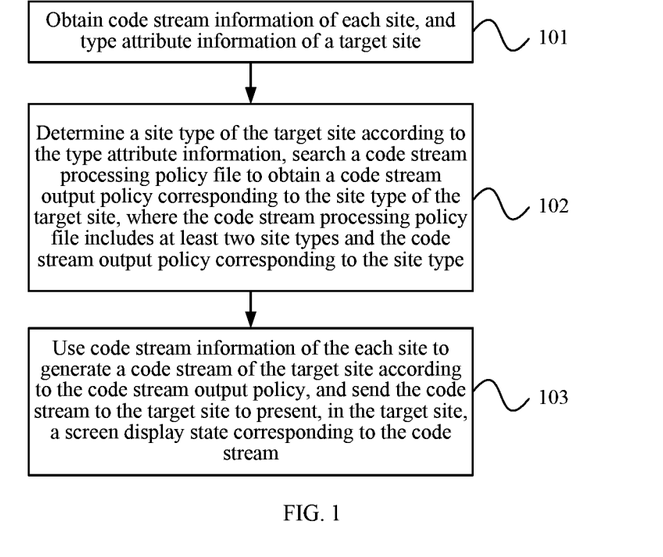
FIG. 1 is a flowchart of Embodiment 1 of a code stream processing method according to the present disclosure.

FIG. 1 is a flowchart of Embodiment 1 of a code stream processing method according to the present disclosure. As shown in FIG. 1, the method includes the following process:

101: Obtain code stream information of each site, and type attribute information of a target site.

In 101, an MCU obtains code stream information of each participating site, each participating site is any site in a multipoint video conference system, and the code stream information of each site is information formed by video information of each site and image information demonstrated on a terminal, for example, may be information formed by images shot by cameras set in each site from different angles of each site and Power Point PPT information demonstrated on a terminal device of each site.

Type attribute information of a target site is obtained. The target site is a site that needs to present code stream information of a specific site on a site terminal, type attribute information of a site is information that can reflect the site characteristic, the type attribute information of a site, for example, may be a quantity of terminal device screens of the site, role of the site, geographic location of the site, whether a speech is required in the site, and the type attribute information of a site may further be other information that can reflect the site characteristic, which cannot be enumerated in this embodiment. The following further describes the obtaining type attribute information of a target site using an example that type attribute information of a site is a role of the site. For example, when a training conference is held, the roles participating in the conference are teacher and student, so the type attribute information of the target site may be teacher or student, and the type attribute information of the target site may be manually set as required.

102: Determine a site type of the target site according to the type attribute information, search a code stream processing policy file to obtain a code stream output policy corresponding to the site type of the target site, where the code stream processing policy file includes at least two site types and the code stream output policy corresponding to the site type.

In 102, according to the type attribute information of the site in 101, a site type of the target site is determined, and the site type is a category of sites with specific type attribute information. In this embodiment, for example, the type attribute information of the target site is student, the terminal device of the target site is 3 display screens, that is, a 3-screen site, and so the site type of the target site is a 3-screen student site. A code stream processing policy file is searched to obtain a code stream output policy corresponding to the 3-screen student site, where the code stream output policy is a presentation manner of a code stream in the target site, that is, a code stream presentation manner of the 3-screen student site. If the type attribute information of the target site is teacher, the terminal device of the target site is 2 display screens, that is, a 2-screen site, so the site type of the target site is a 2-screen teacher site. A code stream output policy corresponding to the 2-screen teacher site is obtained from the code stream processing policy file, where the code stream output policy is a code stream display manner of a site.

103: Use code stream information of each site to generate a code stream of the target site according to the code stream output policy, and send the code stream to the target site to present in the target site a screen display state corresponding to the code stream.

In 103, according to the code stream output policy obtained in 102, code stream information that needs to be presented in the target site is used to generate a new code stream, where the new code stream is a code stream of the target site, the code stream of the target site is sent to the target site, and the target site presents the code stream on the terminal device, which may specifically be: display video information included in the code stream and image information demonstrated by the terminal on a corresponding screen of the terminal device of the target site, and play audio information included in the code stream on the terminal device of the target site according to a time sequence.

In this embodiment, an MCU obtains code stream information of each site, and type attribute information of a target site; determines a site type of the target site according to the type attribute information, searches a code stream processing policy file to obtain a code stream output policy corresponding to the site type of the target site, uses the code stream information of each site to generate a code stream of the target site according to the code stream output policy, and sends the code stream to the target site to present in the target site a screen display state corresponding to the code stream. The target site is abstracted into different site types according to the type attribute information, and the code stream processing policy file includes a code stream output policy of each site type, so that each target site has a code stream output policy corresponding to the target site. Evidently, because the code stream output policy includes code stream output policies corresponding to multiple site types of a target site, even if a participating site changes, there is always a code stream output policy corresponding to the participating site, so that the adaptability of the code stream processing policy is strong.

On the basis of the forgoing embodiment, the code stream processing policy file further includes: at least one conference mode, and at least one conference state; each conference mode includes the at least one conference state; before the obtaining the code stream output policy corresponding to the site type of the target site, the method further includes: obtaining a conference mode and conference state of the target site; and the obtaining a code stream output policy corresponding to the site type of the target site includes: obtaining a code stream output policy corresponding to the conference mode, conference state, and site type of the target site.

Further, on the basis of the forgoing embodiment, the obtaining a conference mode and conference state of the target site includes: obtaining in a conference reservation or conference ongoing process; and the conference mode and conference state obtained in the conference ongoing process include: an updated conference mode and conference state.

Specifically, according to a user requirement, multiple site modes may be predetermined while a code stream processing file is predetermined, multiple conference states may be predetermined in each site mode, and also in the conference ongoing process, the conference mode or conference state may be switched. For example, the code stream processing file includes a training type conference and a party type conference, an initial conference mode of a video conference is a training mode, and an initial conference state is an interaction state. In the conference process, an operator of a conference system may switch the conference mode from a training mode to a party type conference, and after switching each site obtains a code stream output policy in a party type conference according to the code stream processing file and presents a screen display state corresponding to the code stream output policy.

Figure 2:
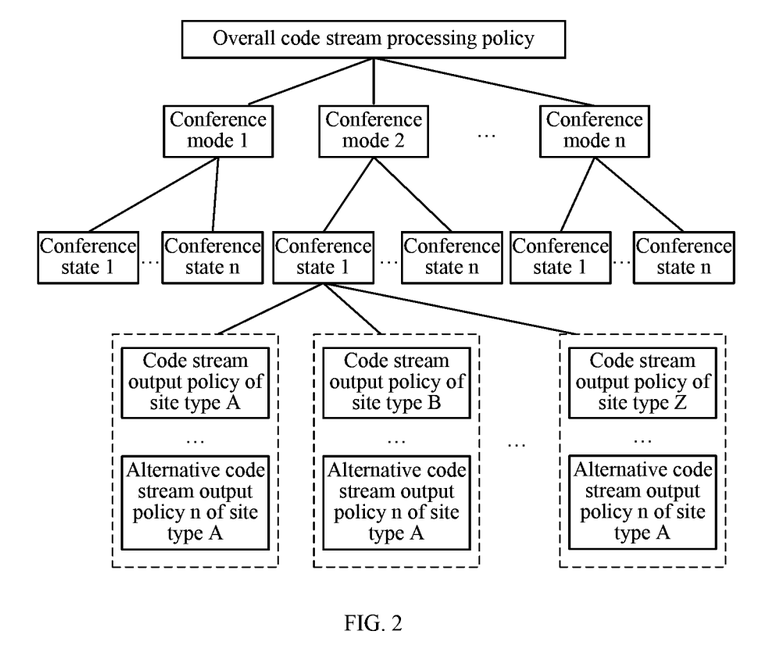
FIG. 2 is a tree diagram of a code stream processing policy file according to the present disclosure.
Figure 3:
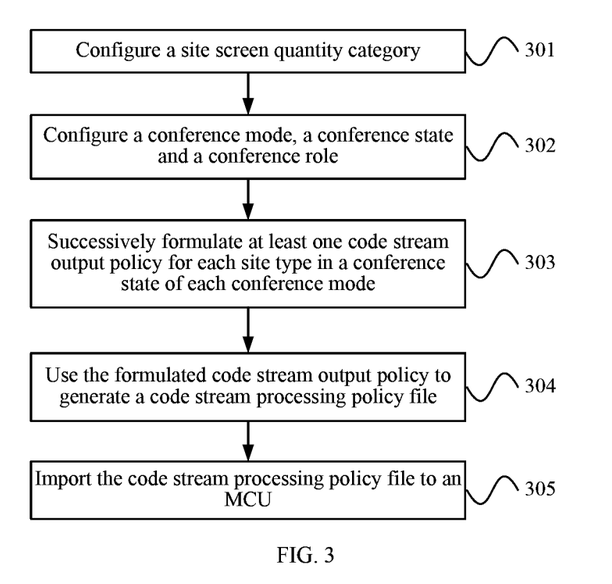
FIG. 3 is a flowchart of a method for formulating a code stream processing policy file according to an embodiment of the present disclosure.

Specifically, FIG. 2 is a tree diagram of a code stream processing policy file according to the present disclosure, and FIG. 3 is a flowchart of a method for formulating a code stream processing policy file according to an embodiment of the present disclosure. Referring to FIG. 2 and FIG. 3 at the same time, the code stream processing policy file may include a code stream processing policy of at least one conference mode, and a code stream processing policy of each conference mode may further include a code stream processing policy of at least one conference state. For example, in FIG. 2, conference mode 1 in an overall code stream processing policy may be a birthday party or relaxation party type conference mode, conference mode 2 may be a training type conference mode, conference mode n may be a progress report or commendation type conference mode, conference state 1 in conference mode 2 may be a training state, conference state n in conference mode 2 may be a group free discussion state, a code stream output policy of site type A may be a code stream output policy of a 3-screen teacher site, alternative code stream output policy n of site type A may be an alternative code stream output policy of a 3-screen teacher site, a code stream output policy of site type B may be a code stream output policy of a 2-screen student site, and alternative code stream output policy n of site type B may be an alternative code stream output policy of a 2-screen student site.

The method for formulating a code stream processing policy file, for example, may be:

301: Configure a site screen quantity category.

A quantity of site screens of all sites in a video conference system is obtained, for example, the video conference system has 4 sites in total, a quantity of screens of terminal devices of the 4 sites are respectively 1, 2, 2 and 3, so the site screen quantity category is 3 categories.

302: Configure a conference mode, a conference state and a conference role.

A conference mode that may be convened using a video conference system is configured, for example, configuring a birthday party/relaxation party mode, a training type conference mode and a commendation conference mode, where the conference state of configuring a birthday party/relaxation party mode is: a letting off fireworks state, singing birthday song state, blowing out candles state and having dinner party state; the conference mode of configuring a training type conference state is: a training state, free discussion state and questioning state; the conference state of configuring a commendation conference mode is: host speech state, work report state and reviewing state, and configuring a conference role, for example, conference roles configured for a birthday party/relaxation party mode include host and guest; conference roles configured for a training type conference mode include lecturer, student and recorder; conference roles configured for a commendation conference mode include host, leader, work reporter, recorder and audience.

The forgoing configuration process may specifically be entered in a text box provided by a tool for formulating a code stream processing policy file by an operator who formulates a code stream processing policy file, for example, may be forms shown in Table 1:

TABLE 1

| Create a conference mode | |
|---|---|
| Conference mode | Training type conference |
| Conference state | Training type + free discussion state + questioning state |
| Conference role | Lecturer + student + recorder |
| Confirm | Close |

The tool for formulating a code stream processing policy file may be an independent device or a function module of a device in a video conference system, which is not limited herein.

303: Successively formulate at least one code stream output policy for each site type in a conference state of each conference mode.

For the 3 conference modes configured in 302, at least one code stream output policy for each site type in a conference state of each conference mode is successively formulated, for example: a site screen quantity category is 3, and a site role of a training type conference mode is 3, so site screen quantity category×site role, that is, 3×3 code stream output policies of the site type are formulated for each conference state of the training type conference mode, a quantity of the 3×3 code stream output policies of the site type is at least one, and then at least 1 code stream output policy is successively formulated for a birthday party/relaxation party mode, and 3×3 site types of each conference state of a commendation type conference mode, that is, a quantity of code stream output policies corresponding to the site type is at least one.

In this embodiment, the site type of each site includes two factors: a site screen quantity category and a site role, and in other embodiments, the site type may include at least one other site factor that reflects site type attribute information, and at least two site types may be permutation and combination types acquired by performing permutation and combination on the at least one other site factor. Specifically, for example: the at least one other site factor of the site type attribute information is: a site region and whether a speech is required in a site, 2 types of the site region are: Beijing and Shanghai, and 2 types of whether a speech is required in a site are: speech required and no speech required. Therefore, permutation and combination is performed on site regions: Beijing and Shanghai, and whether a speech is required in a site: speech required and no speech required, to acquire 4 site types: Beijing speech required site, Beijing no speech required site, Shanghai speech required site and Shanghai no speech required site.

304: Use the formulated code stream output policy to generate a code stream processing policy file.

The code stream output policies of the 3 conference modes are used to generate a code stream processing policy file, where the code stream processing policy file may be described in an XML file manner.

305: Import the code stream processing policy file to an MCU.

If the tool for generating the code stream processing policy file is an external tool, the generated code stream processing policy file may be imported to the MCU.

To describe the code stream processing method of the present disclosure more clearly, this embodiment is described only using that type attributes of a site are site screen quantity and site role as an example, but the type attributes of the site in the embodiment of the present disclosure are not limited to the attribute information mentioned above. In other embodiments, the code stream processing method provided by the embodiment of the present disclosure may be executed according to type attributes of other sites such as site location and whether a speech is required in a site.

To make the code stream processing method provided by the embodiment of the present disclosure more clearly, the following uses a specific example for description in detail:

In this embodiment, for example: a training organization hopes to use a video conference system to solve the problem that teachers deliver lectures in different places. The types of people that use the video conference system to participate in training are student and teacher, the types of terminal devices of the video conference system of the training organization are 3-screen and single-screen, and the training organization expects that the code stream presentation manner of the target site is:

1. A teacher may select any single-screen site or any three-screen site to deliver a lecture; and a student may select any single-screen site or any three-screen site to attend a lecture.

2. The conference is classified into: a training state and an interaction state, two conference states in total.

Figure 4A:
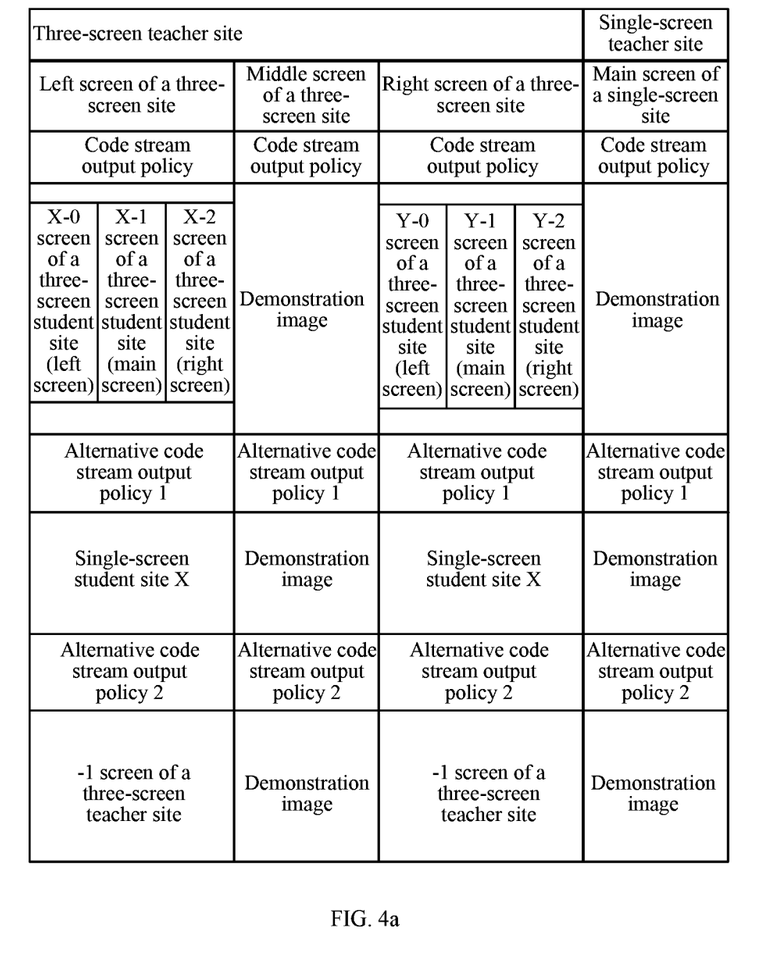
FIG. 4a is a code stream display policy when a teacher site is a three-screen or single-screen site in a training state.

3. In a training state, if a teacher site is a three-screen site, the main screen, that is, the middle screen displays a demonstration image; and the left screen and the right screen preferentially display any three-screen student site in a three split screen mode. If there is no three-screen student site, any 3 single-screen student sites are displayed; if a quantity of single-screen student sites is less than 3, one student site is displayed in a single-screen manner; and if a quantity of single-screen sites is not enough, the main screen of a local site, that is, a −1 screen of a three-screen teacher site is displayed. That is, a quantity of code stream output policies corresponding to the main screen of the three-screen teacher site is one, and a quantity of code stream output policies corresponding to the left screen and the right screen of the three-screen teacher site is three.

If a teacher site is a single-screen site, a demonstration image of the local site is displayed, that is, a quantity of code stream output policies corresponding to the single-screen teacher site is one.

FIG. 4a is a code stream display policy when a teacher site is a three-screen or single-screen site in a training state. Understand the foregoing processes by referring to FIG. 4a.

Figure 4B:
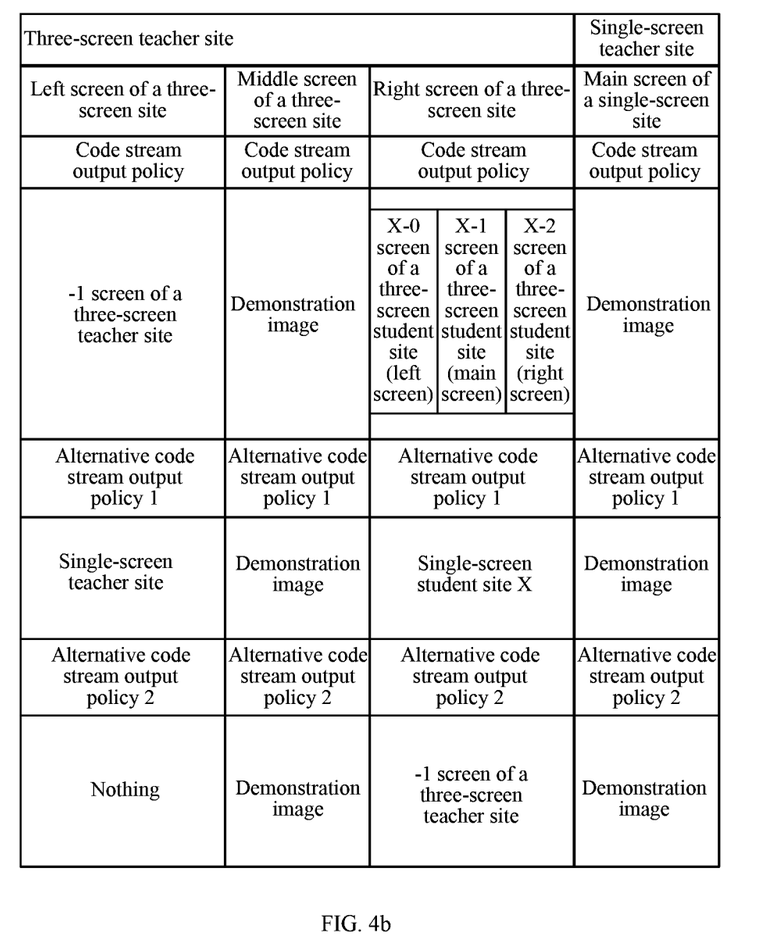
FIG. 4b is a code stream display policy when a student site is a three-screen or single-screen site in a training state.

If the student site is a three-screen site, the main screen displays a demonstration image, the left screen displays the main screen of the teacher site (if the teacher site is a single-screen site, the main screen is a display screen of the single-screen site), and the right screen preferentially displays one three-screen student site in a three split screen mode. If there is no three-screen student site, 3 single-screen student sites are displayed, and if a quantity of single-screen student sites is less than 3, the main screen of the 3-screen teacher site is displayed. That is, a quantity of code stream output policies corresponding to the main screen of the three-screen student site is one, a quantity of code stream output policies corresponding to the left screen of the three-screen student site is two, and a quantity of code stream output policies corresponding to the right screen of the three-screen student site is three.

If a student site is a single-screen site, a demonstration image of the teacher site is displayed, that is, a quantity of code stream output policies corresponding to the single-screen student site is one.

FIG. 4b is a code stream display policy when a student site is a three-screen or single-screen site in a training state. Understand the foregoing process by referring to FIG. 4b.

Figure 5A:
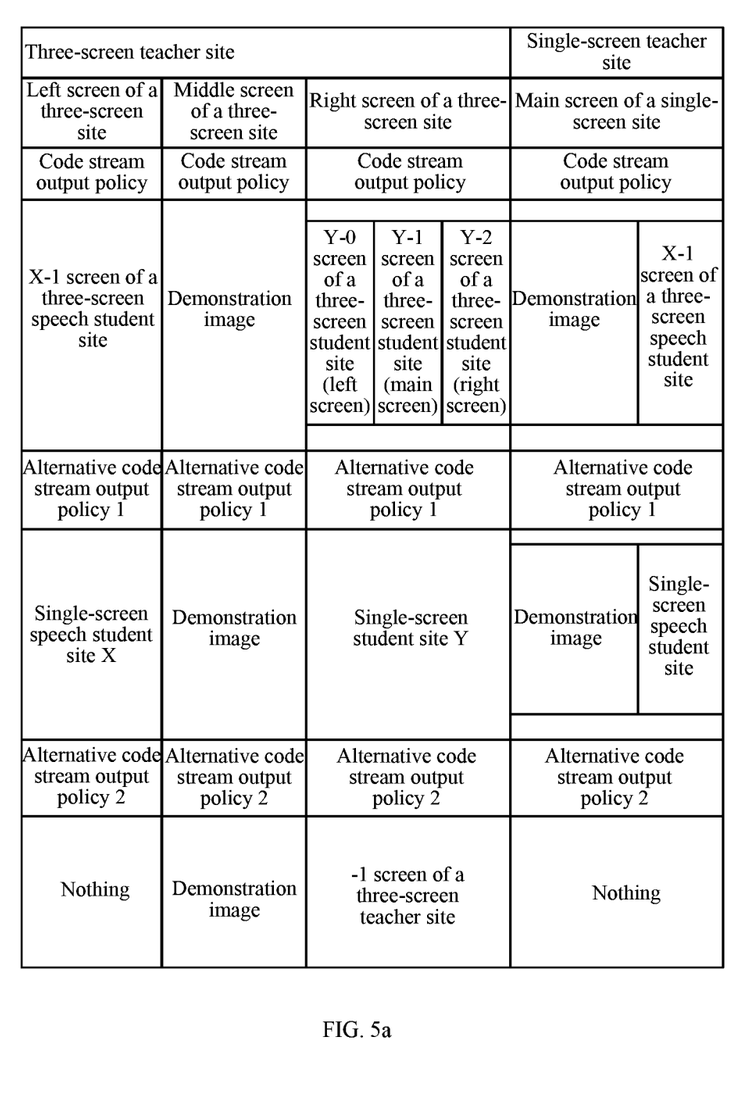
FIG. 5a is a code stream display policy when a teacher site is a three-screen or single-screen site in an interaction state.

4. In an interaction state, a student site allows asking questions. If a teacher site is a three-screen site, the main screen displays a demonstration image, the left screen displays the main screen of a student site that is asking a question, and the right screen preferentially displays one three-screen student site in a three split screen mode. If there is no three-screen student site, 3 single-screen student sites are displayed; if a quantity of single-screen student sites is less than 3, one student site is displayed on a single screen; and if a quantity of single-screen sites is not enough, the main screen of a local site is displayed.

If a teacher site is a single-screen site, a demonstration image and the main screen of a student site that is talking are displayed in a 2 split screen mode.

FIG. 5a is a code stream display policy when a teacher site is a three-screen or single-screen site in an interaction state. Understand the foregoing process by referring to FIG. 5a.

Figure 5B:
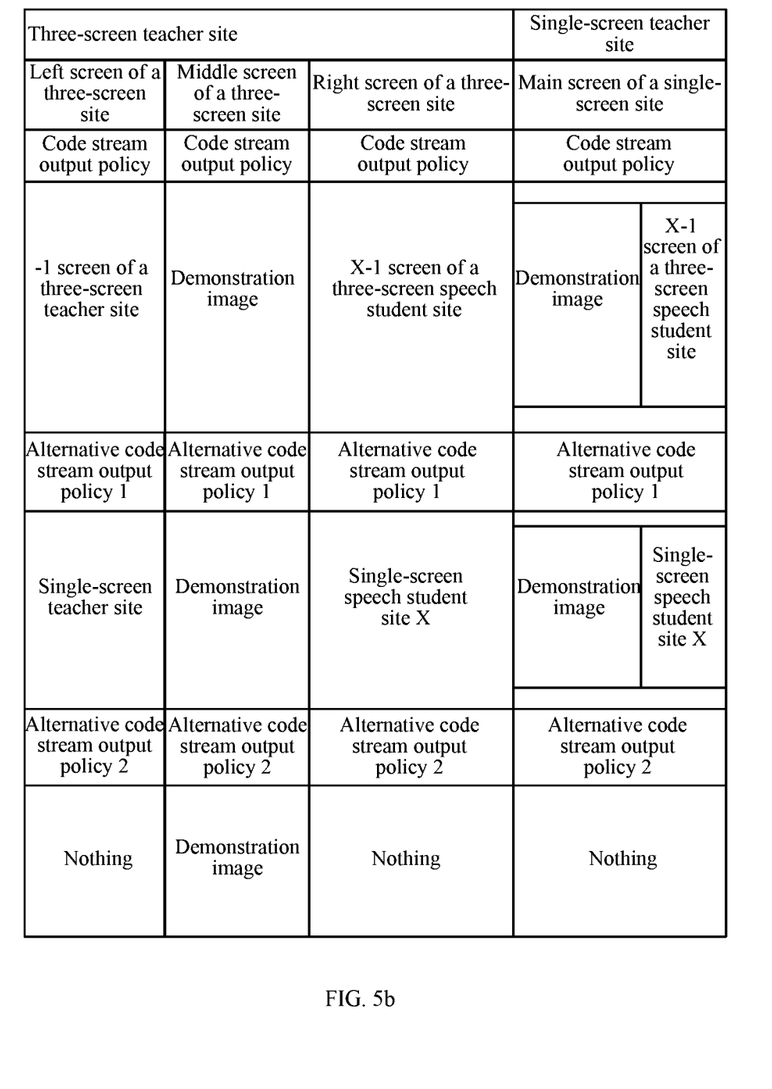
FIG. 5b is a code stream display policy when a student site is a three-screen or single-screen site in an interaction state.

If a student site is a three-screen site, the main screen displays a demonstration image, the left screen displays the main screen of a teacher site, and the right screen displays the main screen of a student site that is talking.

If a student site is a single-screen site, a demonstration image and a site that is talking are displayed in a 2 split screen mode.

FIG. 5b is a code stream display policy when a student site is a three-screen or single-screen site in an interaction state. Understand the foregoing process by referring to FIG. 5b.

Figure 6:
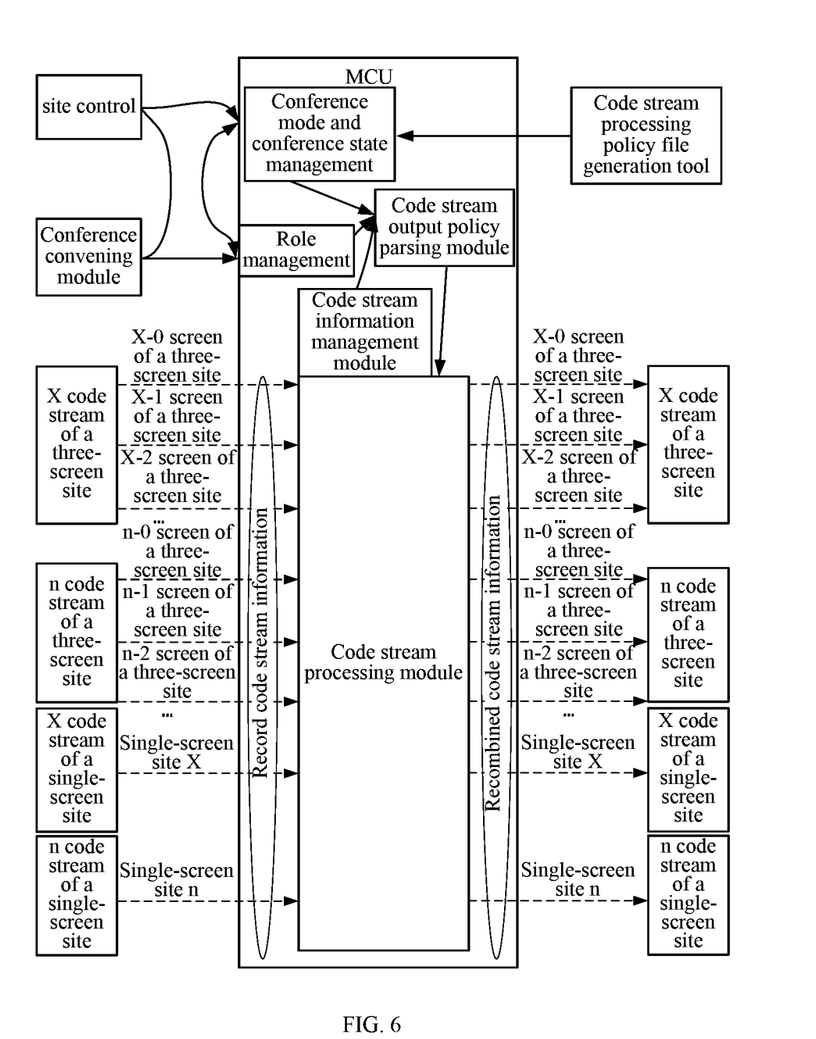
FIG. 6 is a schematic principle diagram of a code stream processing method according to an embodiment of the present disclosure.

FIG. 6 is a schematic principle diagram of a code stream processing method according to an embodiment of the present disclosure. As shown in FIG. 6, a code stream processing policy file generation tool may be used to describe the foregoing requirements of the training organization in an XML file manner to generate a code stream processing policy file. The conference mode included in the code stream processing policy file is a training mode, the conference state is a training state+interaction state, and the site role is teacher+student. In each conference state of the conference mode, a code stream output policy corresponding to each site type is an output policy described above, that is, a code stream presentation manner of each site type. The code stream processing policy file is imported to a conference mode and conference state management module of an MCU of a video conference system.

When the video conference system is used to hold a training conference corresponding to a mode included in the code stream processing policy file, the following methods may be included:

In a conference convening module, this conference is set to a training mode, a conference state is+interaction state, and a site role is teacher+student. For a designated participating site, for example, a participating site for this conference may be selected by selecting a site ID.

The conference convening module sends site role information to a role management module of the MCU, and sends conference mode and conference state information to the conference mode and conference state management module of the MCU.

Each participating site sends code stream information to a code stream processing module of the MCU, and the MCU records the code stream information using a code stream information management module.

The conference mode and conference state management module determines a site type of each target site according to the conference mode and conference state of this conference and the conference role of this conference sent by the role management module, searches a code stream processing policy file, and sends a corresponding code stream processing policy to a code stream output policy parsing module of the MCU.

The code stream output policy parsing module parses the corresponding code stream processing policy and obtains a code stream output policy corresponding to each site type, and sends the code stream output policy to a code stream processing module of the MCU. The code stream processing module performs recombination, according to the code stream output policy, on the received code stream information sent by each participating site, and sends the recombined code stream to each target site correspondingly.

Each target site, according to the received code stream, presents on a terminal device video information included in the code stream and plays audio information included in the code stream.

On the basis of the foregoing embodiment, before obtaining the code stream output policy corresponding to the site type of the target site, the method further includes: obtaining updated type attribute information of the target site, and determining an updated site type of the target site according to the updated type attribute information; and the obtaining a code stream output policy corresponding to a site type of the target site specifically is: obtaining corresponding to the updated site type of the target site. The code stream output policy may further include: a code stream output policy corresponding to the site type, and conference control information corresponding to the site type.

Specifically, for example, a birthday party/relaxation party is held using a video conference system. This type of conference generally includes but is not limited to roles of host and guest. Generally a host has a highest operation rights for the video conference system, and may control the progress of the whole party. Conference states corresponding to this type of conference generally include: letting off fireworks, singing a birthday song, blowing out candles and having a dinner party. Generally, after a conference starts, in a default state, the code stream output policy received by each site includes: displaying welcoming speech displayed at a host site and playing birthday background music. The code stream output policy may further include conference control information. In a default state, the conference control information of a host site may include letting off fireworks, singing a birthday song, blowing out candles, having a dinner party, recording videos and taking group pictures, and the conference control information of a guest site may include watching, recording videos and taking group picture.

When a host selects letting off fireworks in the conference control information, the conference state changes from a default state to a letting off fireworks state. At this time, an event of changing a code stream output policy is triggered. A conference mode and conference state management module of the MCU determines whether the triggered event is switching a conference mode. If yes, a code stream output policy file is searched according to an updated conference mode and type attribute information of other sites to obtain a code stream output policy corresponding to the updated conference mode of each target site, for example, correspondingly, each guest site presents fireworks being let off.

If no, whether the triggered event is switching a conference state is determined; if yes, the code stream output policy file is searched according to an updated conference state and type attribute information of other sites to obtain a code stream output policy corresponding to the updated conference state of each target site.

If no, whether the triggered event is switching a conference role continues to be determined; if yes, the code stream output policy file is searched according to an updated conference role and type attribute information of other sites to obtain a code stream output policy corresponding to the updated conference role of each target site.

If no, whether the triggered event is conference leaving continues to be determined; if yes, according to an updated conference leaving state and type attribute information of other sites, a code stream output policy file is searched to obtain a code stream output policy corresponding to the conference leaving event of each target site.

If no, whether the triggered event is applying for a speech may further continue to be determined; if yes, according to updated speech application information and type attribute information of other sites, a code stream output policy file is searched to obtain a code stream output policy corresponding to the speech application event of each target site is obtained.

When a host selects singing a birthday song in the conference control information, terminal devices of all guest sites display images of any site in a multi-picture mode, and enlarge and highlight the image of the host.

When candles are blown off, all guest sites display the host site, and the host site displays images of all guest sites in a multi-picture mode.

After the dinner party is selected, when a conference enters a free dinner party state, a guest site may be allowed to freely perform conference scenario control, and the guest site may select to have conversations, record videos and take group pictures with other each site using the conference scenario control.

Persons of ordinary skill in the art may understand that, all or a part of the steps of the foregoing method embodiments may be implemented by a program instructing relevant hardware. The foregoing program may be stored in a computer readable storage medium. When the program runs, the steps of the forgoing method embodiments are performed. The foregoing storage medium includes any mediums capable of storing program code, such as a ROM, a RAM, a magnetic disk, or an optical disc.

Figure 7:
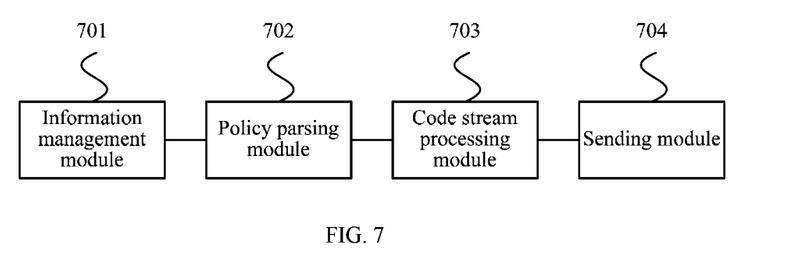
FIG. 7 is a schematic structural diagram of Embodiment 1 of a multipoint control unit MCU according to the present disclosure.

FIG. 7 is a schematic structural diagram of Embodiment 1 of a multipoint control unit MCU according to the present disclosure. As shown in FIG. 7, the multipoint control unit MCU includes: an information management module 701, a policy parsing module 702, a code stream processing module 703 and a sending module 704.

The information management module 701 is configured to obtain code stream information of each site and type attribute information of a target site, and determine a site type of the target site according to the type attribute information.

The policy parsing module 702 is configured to search a code stream processing policy file to obtain a code stream output policy corresponding to the site type of the target site, where the code stream processing policy file includes at least two site types and the code stream output policy corresponding to the site type, and the code stream output policy is a code stream display manner of a site.

The code stream processing module 703 is configured to use code stream information of each site to generate a code stream of the target site according to the code stream output policy.

The sending module 704 is configured to send the code stream to the target site to present in the target site a screen display state corresponding to the code stream.

The multipoint control unit MCU provided by this embodiment may be configured to execute the code stream processing method shown in FIG. 1. The specific execution manner and beneficial effects are similar to those in Embodiment 1 of the code stream processing method. Refer to Embodiment 1 of the code stream processing method. They are not repeated again herein.

In this embodiment, an information management module obtains code stream information of each site and type attribute information of a target site, and determines a site type of the target site according to type attribute information of a site, a policy parsing module searches a code stream processing policy file to obtain a code stream output policy corresponding to the site type of the target site, where the code stream processing policy file includes at least two site types and the code stream output policy corresponding to the site type, the code stream processing module uses the code stream information of each site to generate a code stream of the target site according to the code stream output policy, and the sending module sends the code stream to the target site to present in the target site a screen display state corresponding to the code stream. The target site is abstracted into different site types according to the type attribute information, and the code stream processing policy file includes a code stream output policy of each site type, so that each target site has a corresponding code stream output policy. Even if a participating site changes, there is always a code stream output policy corresponding to the participating site, so that the adaptability of the code stream processing policy is strong.

On the basis of the forgoing embodiment, the code stream processing policy file searched by the policy parsing module 702 may further include: at least one conference mode and at least one conference state; and each conference mode includes the at least one conference state;

the information management module 701 may be further configured to: before the obtaining the code stream output policy corresponding to the site type of the target site, obtain a conference mode and conference state of the target site; and the information management module 701 may be further configured to obtain a code stream output policy corresponding to the conference mode, conference state, and site type of the target site.

Further, on the basis of the forgoing embodiment, the type attribute information obtained by the information management module 701 may further include: at least two site factors; and the at least two site types included in the code stream processing policy file searched by the policy parsing module 702 are permutation and combination types acquired by performing permutation and combination of the at least two site factors.

Further, before obtaining the code stream output policy corresponding to the site type of the target site, the policy parsing module 702 may be further configured to:

obtain updated type attribute information of the target site, and according to the updated type attribute information, determine an updated site type of the target site, and the obtaining a code stream output policy corresponding to a site type of the target site specifically is: the policy parsing module 702 obtains a code stream output policy corresponding to the updated site type of the target site.

Further, the information management module 701 is specifically configured to obtain the conference mode and conference state of the target site in a conference reservation or conference ongoing process; and obtain an updated conference mode and conference state in the conference ongoing process.

Further, the code stream output policy obtained by the policy parsing module 702 may further include: a code stream output policy corresponding to the site type, and conference control information corresponding to the site type.

Further, the MCU further includes a code stream processing policy file generating module, configured to successively formulate at least one code stream output policy for each site type in a conference state of each conference mode according to a configured site screen quantity category, conference mode, conference state and conference role; and use the code stream output policy to generate a code stream processing policy file. In other embodiments, the code stream processing policy file generating module may further be an external functional module independent of the MCU.

Further, a quantity of code stream output policies that correspond to the site type and is obtained by the policy parsing module 702 is at least one.

Figure 8:
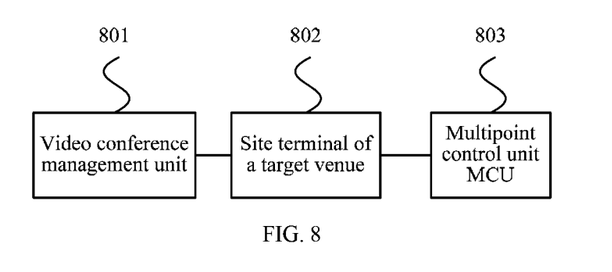
FIG. 8 is a schematic structural diagram of Embodiment 1 of a code stream processing system according to the present disclosure.

FIG. 8 is a schematic structural diagram of Embodiment 1 of a code stream processing system according to the present disclosure. As shown in FIG. 8, the code stream processing system includes: a video conference management unit 801, a site terminal 802 of a target site and a multipoint control unit MCU 803.

The video conference management unit 801 is configured to generate a code stream processing policy file, and send the code stream processing policy file to the MCU.

The site terminal 802 of a target site is configured to receive a code stream sent by the MCU, and display an image corresponding to the code stream according to the code stream.

The multipoint control unit MCU 803 is any one MCU provided in forgoing embodiment of a multipoint control unit MCU.

On the basis of the forgoing embodiment, further, the site terminal 802 of the target site or the video conference management unit 801 may be further configured to obtain updated type attribute information of the target site, and send the updated type attribute information to the multipoint control unit MCU 803, so that the multipoint control unit MCU 803 determines an updated site type of the target site according to the updated type attribute information.

Finally, it should be noted that the foregoing embodiments are merely intended for describing the technical solutions of the present disclosure, rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all the technical features thereof as long as the modifications and replacements do not make the essence of the corresponding technical solutions depart from the scope of the technical solutions of the embodiments of the present disclosure.

What is claimed is:

1. A method for multipoint video conferencing involving a plurality of sites, including a target site, the method comprising:

obtaining, by a multipoint control unit (MCU), code stream information of each of the plurality of sites, and type attribute information of the target site;

determining, by the MCU, a site type of the target site according to the type attribute information;

obtaining, by the MCU, a code stream output policy corresponding to the site type of the target site based on a code stream processing policy file, wherein the code stream processing policy file comprises at least two site types and code stream output policies corresponding to each of the at least two site types;

generating, using the obtained code stream information, a code stream for the target site according to the obtained code stream output policy; and sending the generated code stream to the target site to present the generated code stream at the target site;

wherein before obtaining the code stream output policy, the method further comprises: obtaining a conference mode and a conference state of the target site; and wherein the obtained code stream output policy further corresponds to the conference mode and the conference state of the target site.

2. The method according to claim 1, wherein type attribute information of a particular site comprises at least two parameters, and the site type of the particular site is based on the parameters corresponding to the site.

3. The method according to claim 1, wherein before obtaining the code stream output policy, the method further comprises:

obtaining updated type attribute information of the target site;

wherein determining the site type of the target site is according to the updated type attribute information.

4. The method according to claim 1, wherein the conference mode and the conference state of the target site are obtained in a conference reservation or conference ongoing process.

5. The method according to claim 1, wherein the code stream output policy comprises conference control information corresponding to the site type.

6. The method according to claim 1, wherein the obtained code stream output policy is one of a plurality of code stream output policies, wherein the plurality of code streams output policies include at least one code stream output policy for each site type in each conference state of each conference mode according to a configured site screen quantity category, conference mode, conference state and conference role.

7. The method according to claim 1, wherein a quantity of code stream output policies that corresponds to the site type is at least one.

8. A multipoint control unit (MCU), comprising a processor and a non-transitory processor-readable medium having processor-executable instructions stored thereon that are executable by the processor, the processor-executable instructions including a plurality of modules, the plurality of modules comprising:

an information management module, configured to obtain code stream information of each of a plurality of sites, including a target site, to obtain type attribute information of the target site, and to determine a site type of the target site according to the type attribute information;

a policy parsing module, configured to obtain a code stream output policy corresponding to the site type of the target site based on a code stream output policy file, wherein the code stream processing policy file comprises at least two site types and code stream output policies corresponding to each of the at least two site types;

a code stream processing module, configured to generate, using the obtained code stream information, a code stream for the target site according to the code stream output policy; and a sending module, configured to send the generated code stream to the target site to present the generated code stream at the target site;

wherein the information management module is further configured to: obtain a conference mode and a conference state of the target site; and wherein the obtained code stream output policy further corresponds to the conference mode and the conference state of the target site.

9. The MCU according to claim 8, wherein type attribute information of a particular site comprises at least two parameters, and the site type of the particular site is based on the parameters corresponding to the site.

10. The MCU according to claim 8, wherein the information management module is further configured to obtain updated type attribute information of the target site; and wherein determining the site type of the target site is according to the updated type attribute information.

11. The MCU according to claim 8, wherein the information management module is configured to obtain the conference mode and conference state of the target site in a conference reservation or conference ongoing process.

12. The MCU according to claim 8, wherein the obtained code stream output policy comprises conference control information corresponding to the site type.

13. The MCU according to claim 8, wherein the obtained code stream output policy is one of a plurality of code stream output policies, wherein the plurality of code streams output policies include at least one code stream output policy for each site type in a conference state of each conference mode according to a configured site screen quantity category, conference mode, conference state and conference role.

14. The MCU according to claim 8, wherein a quantity of code stream output policies that correspond to the site type and is obtained by the policy parsing module is at least one.

15. A code stream processing system, comprising:
a video conference management unit;
a terminal associated with a target site; and
a multipoint control unit (MCU);
wherein:
the video conference management unit is configured to generate a code stream processing policy file and to send the code stream processing policy file to the MCU;
the terminal is configured to receive a code stream sent by the MCU and to display an image corresponding to the code stream according to the code stream;
the MCU comprises:
an information management module, configured to obtain code stream information of each of a plurality of sites, including the target site, to obtain type attribute information of the target site, and to determine a site type of the target site according to the type attribute information;

a policy parsing module, configured to obtain a code stream output policy corresponding to the site type of the target site based on the code stream processing policy file, wherein the code stream processing policy file comprises at least two site types and code stream output policies corresponding to each of the at least two site types;

a code stream processing module, configured to generate, using the obtained code stream information, a code stream for the target site according to the obtained code stream output policy; and a sending module, configured to send the generated code stream to the target site to present the generated code stream at the target site;

wherein the information management module is further configured to: obtain a conference mode and a conference state of the target site; and wherein the obtained code stream output policy further corresponds to the conference mode and the conference state of the target site.

16. The system according to claim 15, wherein the terminal or the video conference management unit is further configured to obtain updated type attribute information of the target site and to send the updated type attribute information to the MCU, and the MCU is further configured to determine an updated site type of the target site according to the updated type attribute information.

* * * * *